July 4, 1950

R. S. WEHNER 2,514,020

V-DIPOLE ANTENNA

Filed Nov. 16, 1945

INVENTOR
Robert S. Wehner
BY H. S. Grover
ATTORNEY

July 4, 1950  R. S. WEHNER  2,514,020
V-DIPOLE ANTENNA
Filed Nov. 16, 1945  4 Sheets-Sheet 2

INVENTOR
Robert S. Wehner
BY H. S. Grover
ATTORNEY

July 4, 1950

R. S. WEHNER 2,514,020

V-DIPOLE ANTENNA

Filed Nov. 16, 1945

INVENTOR
Robert S. Wehner
BY J.S.Grover
ATTORNEY

July 4, 1950  R. S. WEHNER  2,514,020
V-DIPOLE ANTENNA
Filed Nov. 16, 1945  4 Sheets-Sheet 4
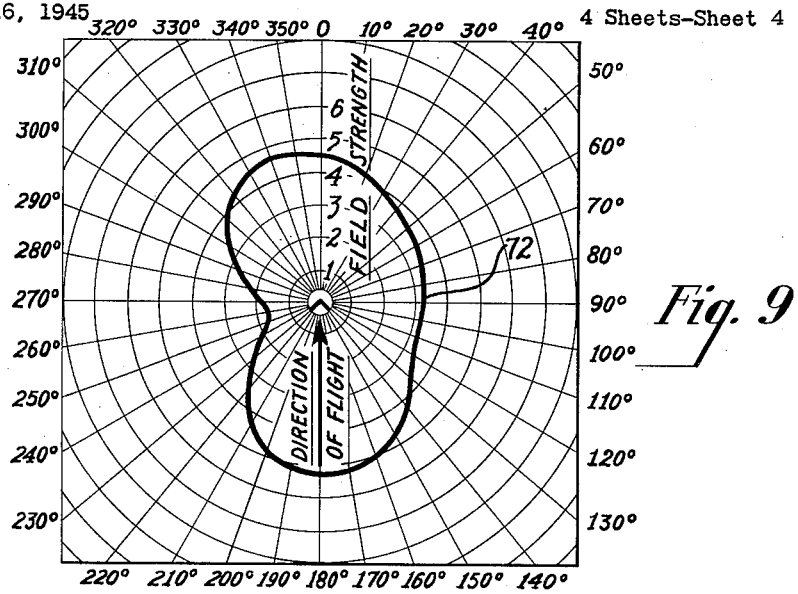
Fig. 9
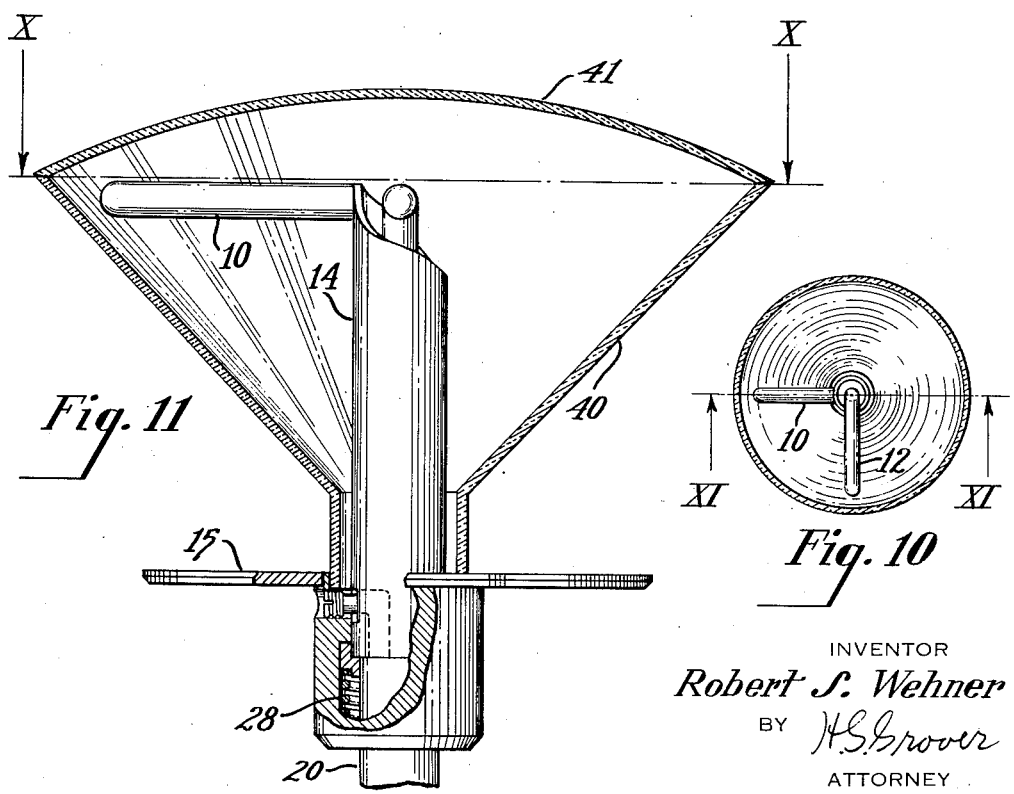
Fig. 11
Fig. 10
INVENTOR
Robert S. Wehner
BY H.S. Grover
ATTORNEY Patented July 4, 1950

2,514,020

UNITED STATES PATENT OFFICE 2,514,020

V-DIPOLE ANTENNA

Robert S. Wehner, Port Jefferson, N. Y., assignor to Radio Corporation of America, a corporation of Delaware Application November 16, 1945, Serial No. 629,168

6 Claims. (Cl. 250—33)

The present invention relates to V-dipole antennas and more particularly to such antennas intended to be used on an aircraft and to be fed from a simple coaxial transmission line.

An object of the present invention is to increase the band width of aircraft antennas.

Another object of the present invention is to provide an aircraft antenna which may be matched to standard coaxial transmission lines with a less than 2:1 standing wave ratio over frequency bands approximately 30% in width.

Another object of the present invention is the provision of an aircraft antenna which when mounted on the underside of the fuselage of the airplane radiates horizontally polarized energy almost exclusively and in a field pattern in the horizontal plane and in the hemisphere below the horizon which is substantially uniform in planes parallel to the horizontal surface against which the antenna is worked and which is substantially symmetric; that is, with the fore and aft maxima very nearly equal in magnitude over the entire frequency band.

Another object of the present invention is the provision of an aircraft antenna which will permit almost instant installation and removal.

A further object of the present invention is the provision of an aircraft antenna which may be installed or changed without the need for tools of any kind.

Still a further object of the present invention is the provision of an aircraft antenna which may be installed or removed entirely from the exterior of the airplane.

Another object of the present invention is the provision of an aircraft antenna which is mechanically strong whereby it will withstand the handling necessary in installation and removal and the stresses attendant to its use on aircraft.

Still a further object of the present invention is the provision of an antenna, as aforesaid, which is supplied with a coaxial cable connector which is capable of being directly connected to the standard coaxial transmission line fittings used by the Army and Navy.

The foregoing objects and others which may appear from the following detailed description are attained by providing a dipole antenna in the form of a ninety to one hundred degree V with quarter wave arms supported and fed from the end of a coaxial line staff extending vertically out from the horizontal ground plane against which the antenna is worked. The arms of the V are mounted parallel to the ground plane and in a particular direction with respect to the line of flight. The arms are attached to the inner and outer conductors of the supporting coaxial feed line which line leads from the feed point at which the arms are attached through an impedance matching section to a standard type "AN" cable connector located inside the airplane.

The present invention will be more fully understood by reference to the following detailed description which is accompanied by a drawing in which:

Figure 1 shows in elevation and partly in section an embodiment of the present invention, while

Figure 3 is a plan view of a modified form of the invention, while

Figures 7, 8 and 9 are field strength patterns of the antenna of Figures 1 and 2;

Figure 10 is a plan view partly in section of a modified form of the present invention, particularly adapted for ultra high frequency service, while Figure 11 is a sectional view of the antenna of Figure 10 taken along line XI—XI of that figure.

Figure 2:
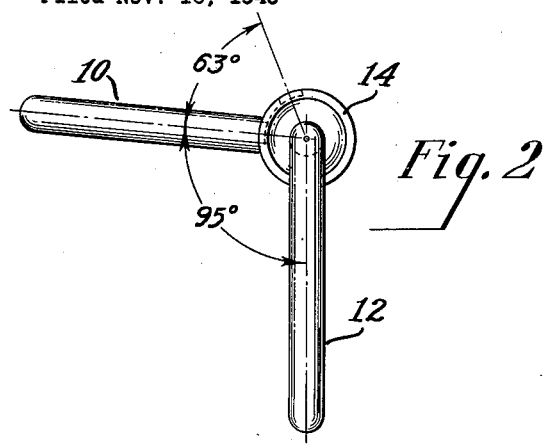
Figure 2 is a plan view of the antenna of Figure 1.
Figure 1:
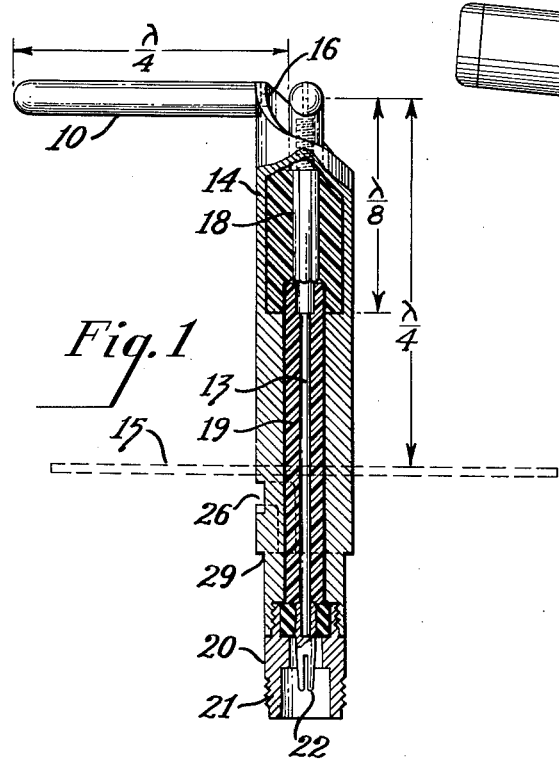

Referring now to Figures 1 and 2, there is shown a V-dipole having arms 10 and 12, each a quarter wave in length, arranged in a ninety to one hundred degree V. The adjacent ends of the quarter wave arms 12, 10 at the apex of the V are connected respectively to the inner conductor 13 and outer shell 14 of a coaxial transmission line which also acts as the supporting means for the V antenna. The coaxial supporting means 14 is maintained in its desired position on the fuselage of an airplane by mounting plate 15 shown in dotted lines in Figure 1 and described more fully with reference to Figures 4 and 5 hereafter.

The extension of the coaxial supporting line 14 from the surface of the fuselage is adjusted to be approximately one-quarter of the operating wavelength. The coaxial line 14 has, between the point of connection of the dipole arms 10 and 12 and the point of connection of the transmission line, a one-eighth wave impedance matching section 18. The inner diameter of the outer conductor 14 in section 18 is somewhat larger than that of the outer conductor throughout the remainder of the line and the outer diameter of the inner conductor 13 in section 18 is somewhat larger than that of the inner conductor throughout the remainder of the line. By properly adjusting the dimensions of the line section 18 with respect to the dimensions of the lower section of the coaxial line support, the series transformer line section 18 matches the impedance of the antenna to that of the line over a comparatively wide band of frequencies. Below the line transformer section the inside diameter of the outer casing 14 of the coaxial line and the diameter of inner conductor 13 are so related to the dielectric constant of the insulating material 19 therebetween that a characteristic impedance equal to that of the line to which it is connected is attained. Thus, the coaxial line section may be dimensioned to have a characteristic impedance of fifty ohms whereby it may be directly connected to a 50 ohm transmission line without introducing reflections at the point of connection. The coaxial fitting 20 may be a standard type "AN" coaxial cable connector having a threaded shell 21 and an inner jack 22 so dimensioned as to accept standard coaxial line fittings.

Figure 4:
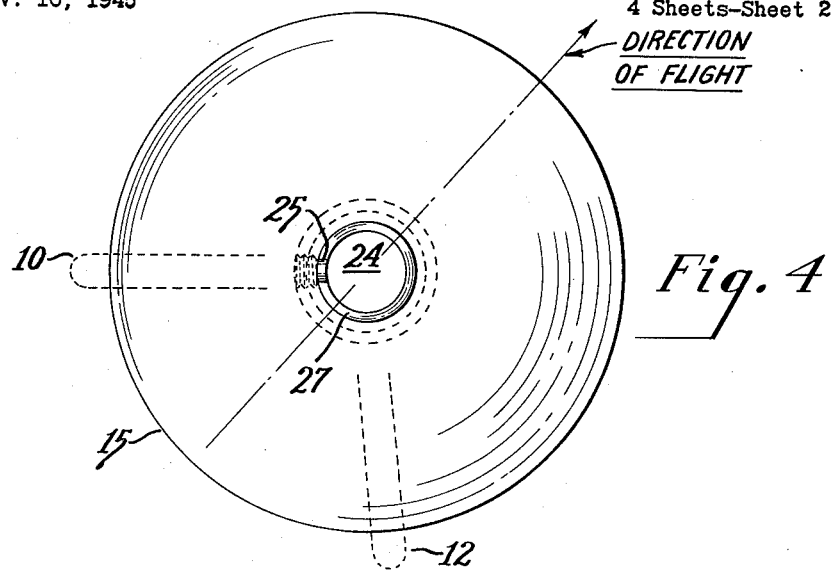
Figure 4 is a plan view of a mounting fixture for the antenna and which is particularly adapted to be secured to the fuselage of an aeroplane.
Figure 5:
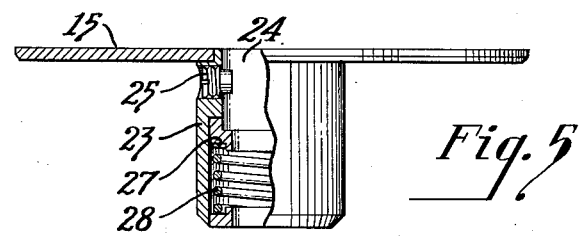
Figure 5 is an elevational view, partly in section, of the mounting of Figure 4.

Referring now to Figures 4 and 5, for the details of the mounting arrangement, it will be noted that mounting plate 15 carries a central sleeve portion 23 having an aperture 24 designed to accept the coaxial standard 14. A screw pin 25 in sleeve 23 is arranged to engage bayonet slot 26 on the coaxial standard 14. A collar 27 pressed upwardly by spring 28 presses against shoulder 29 of the coaxial standard, thus assuring that the bayonet slot 26 will remain in engagement with the pin 25 and maintain the antenna securely in position. The mounting plate 15 is so arranged on the fuselage on which it is mounted that the direction of flight of the plane is as shown by the arrow in Figure 4. The relative position of the dipole arms 10, 12 of the antenna is indicated by dotted lines in Figure 4.

It will be noted that in case it is desired to dismount the antenna and substitute another operating in a different frequency range, all that is necessary is to grasp the antenna staff 14, press it inwardly and rotate it until the slot 26 disengages pin 25 when the antenna and the coaxial line attached thereto may be separated from its supporting means. Then, with the antenna and the coaxial line attached thereto in the clear, the coaxial line may be unscrewed from fitting 20 and another antenna having a corresponding fitting screwed into place. By reversing the process the new antenna may be installed in the plane. This simplicity of operation of changing antennas is particularly useful when the antennas are to be used on pressurized airplanes. In such airplanes access to the antenna installation from within the airplane for the purpose of removal of the antenna or interchanging it is not ordinarily possible.

Figure 3:
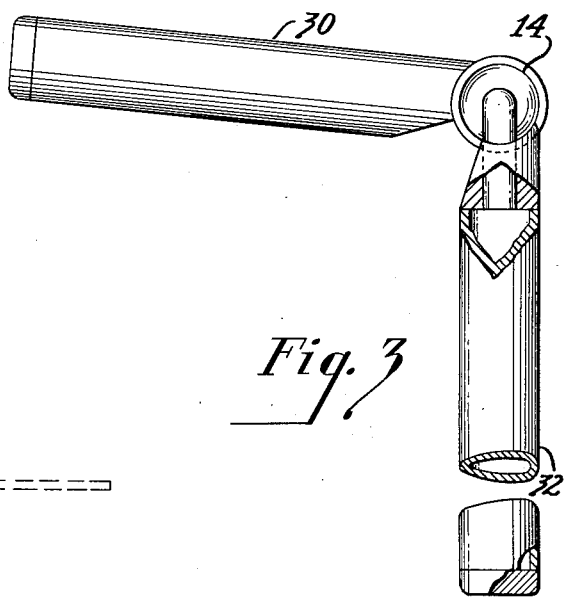

For extremely high speed airplanes it may be desirable to stream line the antenna arms in order to cut down wind resistance and such a form of stream lining is shown in Figure 3. Here the dipole arms 30 and 32 are shown as being tear drop shaped in cross section whereby air resistance is reduced. The remainder of the structure is here shown as being the same as in Figures 1 and 2 and is therefore not again described. However, it is within the scope of my invention to form the outer shell of transmission line 14 to airfoil section also if desired.

It will be noted that the antenna as thus far described is a balanced antenna fed from an unbalanced line without the interposition of a balance transformer. The transformer was found to be undesirable and was omitted because the physical and electrical discontinuities caused by the introduction of a balance transformer into the transmission line system has a disastrous effect upon the band width of the antenna at very high frequencies. By omitting the transformer and feeding the V directly from the coaxial line, impedance characteristics have been attained which permit matching the input impedance of the V antenna to a fifty ohm line with less than a 2:1 standing wave ratio over very wide frequency bands, merely by inserting the coaxial series transformer line section 18 between the feed point and the 50 ohm line section leading to connector 20 at the base of the antenna. The attainment of flat input characteristics depends to some extent upon the size of the arms of the V of the dipole. If the diameter of the arms 10 and 12 is too small the input impedance varies too rapidly to be matched over a wide band by a simple series section. On the other hand, if the arms of the V are too thick, the capacity between the arms and between the arms and the ground plane is such as to lower the input resistance of the antenna greatly and to cause the input reactance to be capacitive over the entire band of frequencies. This will result in impedance characteristics which, although flat, are hardly suitable to broad-banding. However, by the use of a compromise diameter, broad-band impedance characteristics may be obtained so far as the V itself is concerned.

While the omission of a balance transformer makes possible the attainment of broad-band impedance characteristics at high frequencies, it also makes possible the presence of certain pattern defects which are not found with balanced antennas; that is, the antennas may display pattern asymmetry. In some cases radiating currents may be found on the outer surface of the vertical supporting line. However, by properly proportioning the angle between the arms of the dipole the field pattern of a given antenna may be made substantially uniform and symmetrical over a wide band of frequencies 30 to 35% in width.

Since the supporting line is grounded at the point where it enters the ground plane and is approximately one quarter wavelength long at the center of the band, the outer surface of the line acts electrically like a short circuited quarter wave transmission line connected in shunt to the V dipole at the feed point. The shunt line constitutes a high impedance path to ground which, since it is connected in parallel to a low impedance antenna at resonance draws off little of the total current arriving at the feed point. Even over an appreciable range of frequencies the impedance of the supporting feed line is quite high if the effective characteristic impedance of the shunt line is high; that is, if the diameter of the outside of conductor 14 is small. It is apparent that the diameter of the line should be as small as possible from the standpoint of suppressing vertical currents in the outer surface of the feed line but mechanical considerations require that the feedline must be so proportioned as to be strong enough to provide adequate support for the antenna itself when the antenna is carried by an airplane. Thus, the relative diameters of the V arms and the supporting line, the relative diameter of the V in terms of the operating wavelength and the relative diameter of the support with respect to the wavelength as well as the angle of the V play a very important part in obtaining an optimum impedance and pattern characteristics.

In the range of for example 500 to 1500 megacycles per second these adjustments may all be made and attain satisfactory electrical and mechanical characteristics by the use of a V having arms one quarter to one half inch in diameter supported by a supporting line three quarters to one inch in diameter, the actual dimensions depending on the frequency range to be covered. It will be noted that in this frequency range, the V antenna itself is sufficiently rugged that it may be used as a handle in installing or removing the antenna. Alternatively, the V is supported far enough away from the ground plane represented by the fuselage of the airplane so that one may grasp the supporting line 14 directly and so push and twist the antenna into or out of the mounting fixture 15. For high frequency ranges, ranging up to 3000 megacycles the diameter of the supporting line and the diameter of the V arms are necessarily much smaller, being reduced to 3/8" and 1/8" respectively in the range from 2350 to 3050 megacycles per second. These dimensions result in an antenna which is much too small and fragile to be handled as are the lower frequency antennas. An aspect of the present invention, therefore, involves constructing the higher frequency antennas as shown in Figures 10 and 11.

Here the mounting plate 15 and the details of the mounting fixture plugs are the same as shown in Figures 1 and 2 and will not again be described. The antenna itself is surrounded by the housing 40 made of polystyrene or methymethacrylate or other low loss dielectric of sufficient rigidity for the purpose. Preferably the housing 40 is conical in shape covered by a top 41 of a watch glass shape. The exact shape is not too critical provided only that the inner walls are not too close to the antenna elements 10 and 12 and that the lower edges do not extend beyond the edge of the top of the mounting plug. A stream-lined housing may be used if desired although with the very small structures in this frequency band, the over-all height will not extend through the layer of turbulent air carried along by the airplane in its flight. The conical shape is very convenient from the standpoint of ease of installing the antenna or from removing it from the mounting plate 15.

Figure 6:
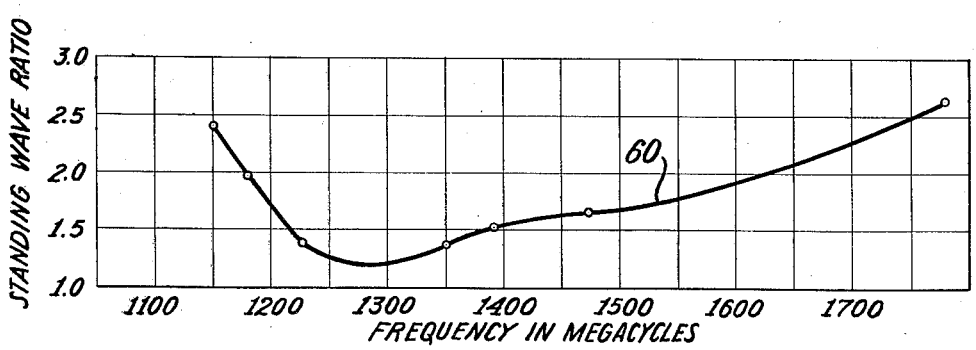
Figure 6 is a curve showing the standing wave ratio over a typical band of frequencies when the antenna of Figures 1 and 2 is connected to a standard transmission line.

In Figure 6 where frequencies in megacycles per second as abscissae are plotted against standing wave ratios as ordinates, curve 60 illustrates the standing wave ratio over a band of frequencies. It will be noted that the standing wave ratio is well under 2½ to 1 for a frequency range extending from 1150 megacycles per second to well over 1700 megacycles per second.

Figure 7:
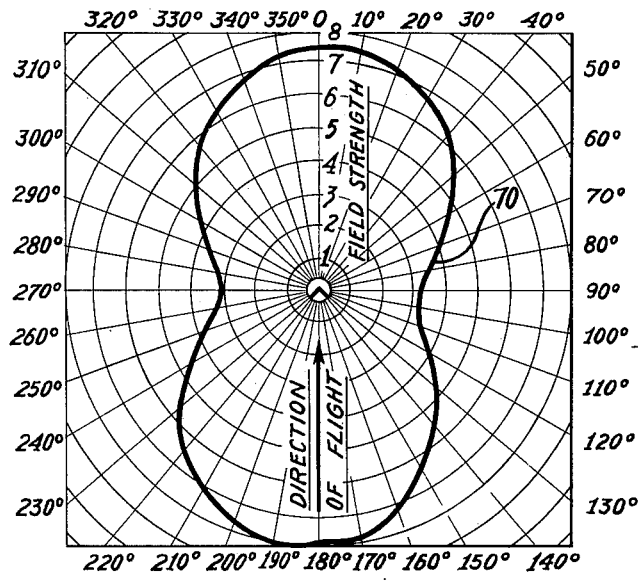
Figure 8:
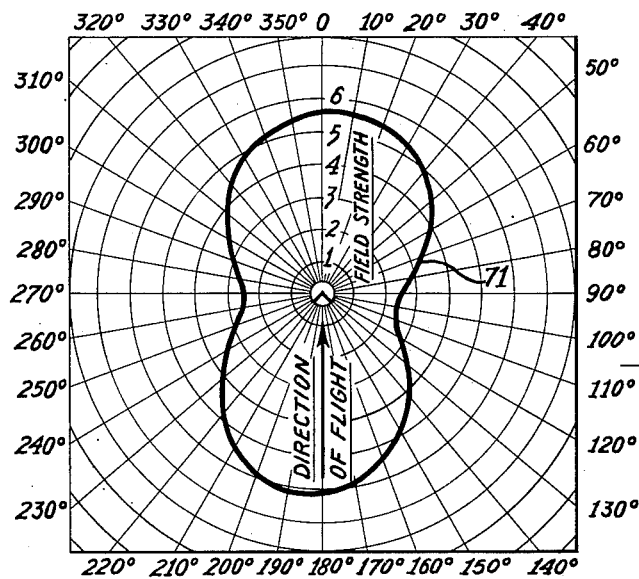

Figure 7 illustrates the field strength pattern in a plane 15 degrees below the horizontal at 1185 megacycles per second of an antenna designed to operate over a range of from 1175 to 1500 megacycles. It will be noted that the pattern is noticeably symmetrical having maxima fore and aft of the plane and that the minima at the sides are no more than 4 db. down in field strength from the fore and aft maxima. Changing the frequency of the antenna to 1280 megacycles, a field pattern in the same plane as shown in Figure 8 is obtained. The pattern is not so symmetrical as that shown in Figure 7 though it still has substantial fore and aft maxima while the said minima are only about 3.7 db. down from the forward maximum. Even when the antenna is operated at 1510 megacycles the field pattern, shown in Figure 9, meets the conditions previously laid down. The pattern while somewhat unsymmetrical is well within allowable limits, the average side minima being only 3 db. down from the forward maximum.

While I have illustrated a particular embodiment of the present invention it should be clearly understood that it is not limited thereto since many modifications may be made in the several elements employed and in their arrangement and it is therefore contemplated by the appended claims to cover any such modifications as fall within the spirit and scope of the invention.

What is claimed is:

1. A broad-band antenna including a pair of radiators lying in a V formation in a plane parallel to a conductive ground sheet and at a distance equal to one quarter of the operating wavelength therefrom, a coaxial supporting line extending from said ground sheet and having an outer shell conductor connected to one of said radiators and an inner conductor connected to the other of said radiators, said connections being made at the adjacent ends of said radiators, the ratio of the inner diameter of said shell and the diameter of said inner conductor being different for a distance of substantially one-eighth wavelength at the operating frequency at the outer end of said transmission line from the ratio over the rest of said line, the ratio of diameters having a value at which the impedance of the end of said transmission line is substantially matched to the impedance of said antenna at the adjacent ends of the radiators.

2. A broad-band antenna including a pair of linear radiators lying in a V formation in a plane parallel to a conductive ground sheet and at a distance therefrom equal to one quarter of the operating wavelength, a hollow conductive supporting means extending from said ground sheet and connected to one of said radiators, another conductor passing through said supporting means in concentric relationship therewith and connected to the other one of said radiators; said connections being made at the adjacent ends of said radiators, the transverse dimensions of said radiators having values at which a substantially constant input impedance is maintained over a wide band of operating frequencies with a low input capacity, the angle between said radiators having a value lying between ninety and one hundred degrees whereby the effect of radiating currents on the outer surface of said supporting means is a minimum, the ratio of the inner diameter of said supporting means to the diameter of said inner conductor being different for a distance of one-eighth wavelength near the outer end of said supporting means from the ratio over the rest of said supporting means, and the ratio of diameters having a value at which the impedance presented at the ends of said hollow supporting means and said conductor remote from said radiators is matched to the input impedance of said antenna at the adjacent ends of the radiators.

3. A broad-band antenna including a pair of radiators lying in a V formation in a plane parallel to a conductive ground sheet and at a distance equal to one quarter of the operating wavelength therefrom, a coaxial supporting line extending from said ground sheet and having an outer shell conductor connected at the end remote from said ground sheet to one of said radiators and an inner conductor connected to the other radiator of the adjacent ends of said radiators, the transverse dimensions of said radiators having values at which a substantially constant input impedance is maintained over a wide band of operating frequencies with a low input capacity, the angle between said radiators having a value lying between ninety and one hundred degrees at which the effect of radiating currents on the outer surface of said supporting line is a minimum, the ratio of the inner diameter of said shell conductor to the diameter of said inner conductor being different for a distance of one-eighth wavelength near the outer end of said transmission line from the ratio over the rest of said line, the ratio of diameters having a value at which the impedance of the end of said transmission line is matched to the impedance of said antenna at the adjacent ends of the radiators.

4. An antenna structure adapted for installation in proximity to a surface access to transmission line means therebehind being prevented by the extent of said surface, comprising a pair of linear radiators lying in V formation in a plane parallel to a conductive ground sheet constituting said surface, a hollow conductive supporting means extending a quarter wavelength from said conductive surface and connected to one of said radiators at the apex of said V formation, another conductor positioned within said hollow supporting means and connected to the other of said radiators, the ratio of the diameter of said other conductor and the inner diameter of said supporting means being different for a distance of one-eighth wavelength near said conductors from the ratio for the remainder of their lengths, said ratio of diameters having a value at which the impedance at ends of said conductors is matched to the transmission line formed by said hollow supporting means and said other conductor at the end remote from said radiators, a coaxial transmission line fitting affixed to the end of said transmission line to connect the same to said transmission line means behind said surface, a mounting plate including a central sleeve portion having an aperture through which said hollow supporting means will pass, a spring biased complementary bayonet pin and slot arrangement mounted in the wall of said aperture and on the exterior of said hollow supporting means selectively to lock the same firmly together and to unlock the same for withdrawal and selective connection and disconnection of said coaxial transmission line fitting.

5. An antenna structure adapted for installation in proximity to a surface access to transmission line means therebehind being impractical, comprising a pair of radiators lying in V formation in a plane parallel to a conductive ground sheet constituting said surface, a hollow conductive supporting means extending a quarter wavelength from said conductive surface and connected to one of said radiators at the apex of said V formation, another conductor positioned within said hollow supporting means and connected to the other of said radiators, the ratio of the diameter of said other conductor and the inner diameter of said supporting means being different for a distance of one-eighth wavelength near said conductors from the ratio for the remainder of their lengths, said ratio of diameters having a value at which the impedance at ends of said conductors is matched to the transmission line formed by said hollow supporting means and said other conductor at the end remote from said radiators, a coaxial transmission line connector affixed to the end of said transmission line to connect the same to said transmission line means behind said surface, a mounting plate including a central sleeve portion having an aperture through which said hollow supporting means will pass, a complementary bayonet pin and slot arrangement mounted in the wall forming said aperture and on the exterior of said hollow supporting means selectively to lock the same firmly together and to unlock the same for withdrawal and selective connection and disconnection of said coaxial transmission line connector.

6. An antenna arrangement adapted for installation in proximity to a structure, a transmission line located behind said structure and inaccessible from the front thereof, comprising a pair of linear radiators lying in a plane parallel to a conductive ground sheet constituting a part of said structure, a hollow conductive supporting means extending a quarter wavelength from said conductive sheet and connected to one of said radiators at the adjacent ends thereof, another conductor positioned within said hollow supporting means and connected to the other of said radiators, the ratio of the diameter of said other conductor and the inner diameter of said supporting means being different for a distance of one-eighth wavelength near said conductors from the ratio for the remainder of their lengths, said ratio of diameters having a value at which the impedance at ends of said conductors is matched to the transmission line formed by said hollow supporting means and said other conductor at the end remote from said radiators, a coaxial transmission line fitting affixed to the end of said transmission line to connect the same to said transmission line means behind said sheet, a mounting plate including a central sleeve portion having an aperture through which said hollow supporting means will pass, complementary interlocking fastening arrangements mounted in the wall of said aperture and on the exterior of said hollow supporting means selectively to lock the same together and to unlock the same for withdrawal anad selective connection and disconnection of said coaxial transmission line fitting.

R. S. WEHNER.

REFERENCES CITED

The following references are of record in the file of this patent:

UNITED STATES PATENTS

| Number | Name | Date |
|---|---|---|
| 2,167,709 | Cork | Aug. 1, 1939 |
| 2,168,860 | Berndt | Aug. 8, 1939 |
| 2,258,953 | Higgins | Oct. 14, 1941 |
| 2,267,889 | Aubert | Dec. 30, 1941 |
| 2,275,646 | Peterson | Mar. 10, 1942 |
| 2,287,220 | Alford | June 23, 1942 |
| 2,297,329 | Scheldorf | Sept. 29 1942 |
| 2,352,977 | Scheldorf | July 4, 1944 |
| 2,370,628 | Alford | Mar. 6, 1945 |
| 2,385,783 | Alford | Oct. 2, 1945 |
| 2,412,867 | Briggs | Dec. 17, 1946 |
| 2,417,895 | Wheeler | Mar. 25, 1947 |
| 2,433,698 | Hurst | Dec. 30, 1947 |
| 2,449,562 | Meier | Sept. 21, 1948 |